United States Patent
Tang et al.

(10) Patent No.: US 10,282,384 B2
(45) Date of Patent: May 7, 2019

(54) SYSTEMS AND METHODS FOR THROTTLING CLICK BAIT

(71) Applicant: Facebook, Inc., Menlo Park, CA (US)

(72) Inventors: Joyce Tang, Danville, CA (US); Khalid Bakry El-Arini, Fremont, CA (US); David Vickrey, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 305 days.

(21) Appl. No.: 14/584,087

(22) Filed: Dec. 29, 2014

(65) Prior Publication Data

US 2016/0188739 A1 Jun. 30, 2016

(51) Int. Cl.
| | | |
|---|---|---|
| *G06F 17/30* | (2006.01) | |
| *H04L 12/58* | (2006.01) | |
| *H04L 29/08* | (2006.01) | |
| *G06F 16/958* | (2019.01) | |
| *G06F 16/951* | (2019.01) | |
| *G06Q 30/02* | (2012.01) | |
| *G06F 16/9535* | (2019.01) | |

(52) U.S. Cl.
CPC .......... *G06F 16/958* (2019.01); *G06F 16/951* (2019.01); *H04L 51/12* (2013.01); *H04L 67/22* (2013.01); *G06F 16/9535* (2019.01); *G06Q 30/0271* (2013.01)

(58) Field of Classification Search
CPC ............... G06Q 50/01; G06Q 30/0254; G06Q 30/0271; G06F 17/30867; G06F 17/30044; G06F 17/3053; G06F 17/3089; G06F 17/30864; G06N 99/005; G06N 5/04; G06N 7/005; G06K 9/627; H04L 43/08; H04L 51/32; H04L 67/22; H04L 51/12

See application file for complete search history.

(56) References Cited

U.S. PATENT DOCUMENTS

| | | | | |
|---|---|---|---|---|
| 8,332,512 | B1 * | 12/2012 | Wu | G06Q 30/0254 705/319 |
| 8,983,948 | B1 * | 3/2015 | Haugen | G06Q 50/01 706/12 |
| 9,055,115 | B2 * | 6/2015 | Bell | H04L 67/22 |
| 9,183,259 | B1 * | 11/2015 | Marra | G06F 17/30867 |
| 2010/0332312 | A1 * | 12/2010 | Klinger | G06Q 10/10 705/14.43 |
| 2013/0291105 | A1 * | 10/2013 | Yan | G06Q 10/06 726/22 |
| 2014/0172977 | A1 * | 6/2014 | Scherpa | H04L 67/2828 709/204 |
| 2014/0180976 | A1 * | 6/2014 | Shama | G06Q 30/02 706/12 |
| 2014/0201126 | A1 * | 7/2014 | Zadeh | G06K 9/627 706/52 |

(Continued)

*Primary Examiner* — Andrew L Tank
(74) *Attorney, Agent, or Firm* — Sheppard Mullin Richter & Hampton LLP

(57) ABSTRACT

Systems, methods, and non-transitory computer readable media configured to determine a value of a utility factor associated with a content item corresponding to a link. An optimized utility value relating to an interaction type of an outbound click is determined based on the value of the utility factor. An expected utility score associated with the content item is generated based on the optimized utility value to determine potential presentation of the content item to a user.

13 Claims, 8 Drawing Sheets

(56) References Cited

U.S. PATENT DOCUMENTS

| | | | |
|---|---|---|---|
| 2014/0229234 A1* | 8/2014 | Yan | G06Q 30/02 |
| | | | 705/7.31 |
| 2015/0006523 A1* | 1/2015 | Das | G06F 17/3002 |
| | | | 707/725 |
| 2015/0052087 A1* | 2/2015 | Srinivasan | G06N 99/005 |
| | | | 706/12 |
| 2015/0088662 A1* | 3/2015 | Noller | G06Q 30/02 |
| | | | 705/14.66 |
| 2015/0242755 A1* | 8/2015 | Gross | G06F 17/30867 |
| | | | 706/46 |

* cited by examiner

SYSTEMS AND METHODS FOR THROTTLING CLICK BAIT

FIELD OF THE INVENTION

The present technology relates to the field of content provision. More particularly, the present technology relates to techniques for reducing undesired content.

BACKGROUND

Today, people often utilize computing devices (or systems) for a wide variety of purposes. Users can use their computing devices to, for example, interact with one another, access content, share content, and create content. In some cases, content items can include postings from members (users) of a social network. The postings may include text and media content items, such as images, videos, and audio. The postings may be published to the social network for consumption by others.

Under conventional approaches, a user may navigate to or be presented with various content items in a social network. Content items can be presented through associated links that can be selected by the user to access and consume the content items. The links are often accompanied by text or other information that suggests subject matter reflected by the associated content item. Further, the suggested subject matter can draw the interest of the user and thereby prompt selection of the link by the user to access the associated content item. In such situations, the user sometimes will find the content item interesting because it reflects the anticipated subject matter. Other times, the user will find the content item irrelevant because it bears little or no relation to the anticipated subject matter. When users repeatedly access items in which they have no interest, user experience suffers. In the context of a social network, frequent access to undesired content items undermines the full potential of the social network to bring the user what she desires.

SUMMARY

Various embodiments of the present disclosure can include systems, methods, and non-transitory computer readable media configured to determine a value of a utility factor associated with a content item corresponding to a link. An optimized utility value relating to an interaction type of an outbound click is determined based on the value of the utility factor. An expected utility score associated with the content item is generated based on the optimized utility value to determine potential presentation of the content item to a user.

In an embodiment, time durations of instances of consumption of the content item by members are determined.

In an embodiment, a histogram of count values relating to a number of members who consumed the content item is created based on a time duration of each instance of consumption of the content item by the members.

In an embodiment, buckets are created with each bucket having an associated time interval.

In an embodiment, a center time for each bucket is determined.

In an embodiment, for each bucket a count value relating to a number of members who consumed the content item over a time duration within a time interval associated with the bucket is determined.

In an embodiment, a normalized factor value associated with the content item is determined based on the center time for each bucket and the count value for each bucket.

In an embodiment, the content item is predicted to likely be click bait based on a distribution of normalized factor values associated with a plurality of content items, the distribution of normalized factor values including the normalized factor value associated with the content item.

In an embodiment, a mapping is performed to produce the value of the utility factor based on the normalized factor value associated with the content item.

In an embodiment, based on the mapping, the value of the utility factor is assigned to be less than one when the content item is predicted to be click bait.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
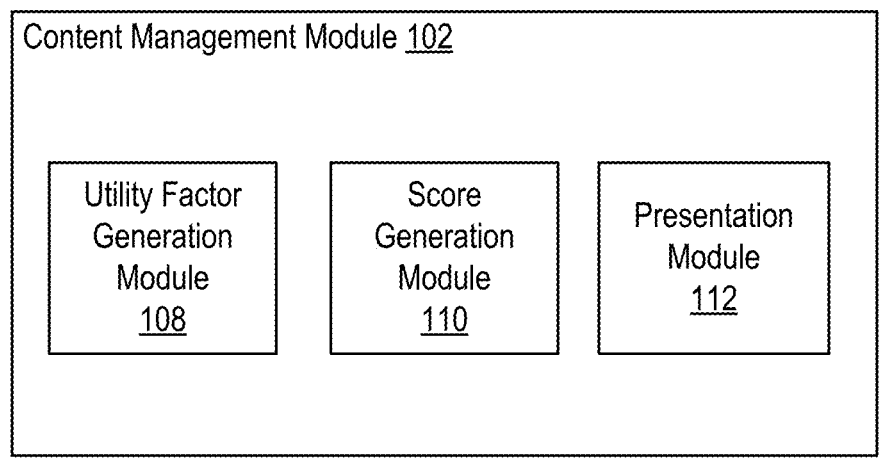
FIG. 1 illustrates a system including an example content management module, according to an embodiment of the present disclosure.
Figure 1:
Figure 1:
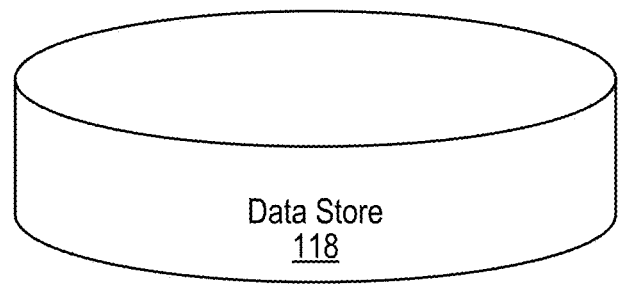

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Reducing the Impact of Click Bait in the Provision of Content

People use computing devices (or systems) for a wide variety of purposes. Computing devices can provide different kinds of functionality. Users can use their computing devices to generate, publish, and access content items. Content items can include any combination of content types, such as text, images, videos, and audio. The content items can be shared for consumption by other users (members) through a social networking system. The content items can be shared in a variety of formats, such as postings to a social networking system.

Under conventional approaches, a user may be presented with various content items in a social network. For example, the content items can be links to content that are shared by, for example, the source of the content, a connection of the user who consumed the content, or the social networking system. The links are often accompanied by text or other information that suggests subject matter of the associated content item. Further, the suggested subject matter can draw the interest of the user and thereby prompt selection of the link by the user to access and consume the associated content item.

As social networking systems increase in members, more focus is unfortunately spent on misleading unsuspecting members to access content items in which they may have little or no interest. For example, text accompanying a link may suggest or state that the associated content item pertains to certain subject matter. Often, the promoted subject matter is deliberately selected for the purpose of maximizing user interest in the associated content item. However, too often the associated content (e.g., click bait) bears no relation to the identified subject matter. When members are confronted with content items in which they have no interest, the experience of the social networking system is compromised. The provision of large volumes of spam in this manner can defeat the goal of enhancing user experience on the social networking system through provision of desired content.

An improved approach to the presentation of content items overcomes the foregoing and other disadvantages associated with conventional approaches. In general, systems and methods of the present disclosure can identify undesirable content items, such as click bait, and reduce (or eliminate) the provision of undesirable content items for presentation to a user. Different types of interactions with respect to content items can be analyzed. In particular, a type of interaction can include an outbound click on a link that results in the presentation of a content item for consumption by a user. A time duration for each instance of consumption of a content item by a member can be detected and maintained. A histogram of count values of members of the social networking system who consumed the content item can be created based on time durations over which the members consumed the content item.

A value of a utility factor can be determined based on the histogram. First, a normalized factor value can be generated to reflect the likelihood that the content item is click bait. The normalized factor value can be converted to a corresponding value of the utility factor based on a mapping. The value of the utility factor, when combined with a utility value, can represent the contribution of an outbound click on a link to the content item in relation to other interaction types in the determination of an overall expected utility score. The potential presentation of the content item to a user can be based on its associated expected utility score. The value of the utility factor can impact the determination of the expected utility score so that content items that are likely click bait are less frequently (or never) presented to the user.

FIG. 1 illustrates an example system 100 including an example content management module 102 to identify undesirable content items, such as click bait, and to reduce or eliminate their potential presentation to a user, according to an embodiment of the present disclosure. A content item can include one or more of a story, article, description, account, interview, text, image, video, audio, etc. Click bait can be (or be part of) a content item that is undesirable to a user. Click bait can be presented to the user after the user is encouraged to select a link (e.g., URL) to a content item based on a suggestion or statement that the content item will be reflect certain subject matter or otherwise be of interest to the user. A link can include any address, expression, locator, or other vehicle (e.g., URL) through which a user can access a content item. A content item can be characterized as click bait based on time durations spent by members to consume (e.g., review, read, watch, hear, etc.) the content item. In many circumstances, relatively shorter durations of time spent by users to consume a content item can be indicative that the content item is likely click bait. Similarly, in many circumstances, relatively longer durations of time spent by users to consume the content item can be indicative that the content item is likely not click bait.

The content management module 102 can include a utility factor generation module 108, a score generation module 110, and a presentation module 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content management module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content management module 102 can be implemented, in part or in whole, as software running on one or more computing devices or systems, such as on a server or client computing device. For example, the content management module 102 can be implemented as or within an application (e.g., app), a program, or an applet, etc., running on a user computing device or client computing system. In some instances, the content management module 102 can, in part or in whole, be implemented within or configured to operate in conjunction with a social networking system (or service), such as the social networking system 630 of FIG. 6. It should be understood that many variations are possible.

The utility factor generation module 108 can compute a value of a utility factor. The utility factor generation module 108 can obtain the time duration over which a member of the social networking system consumed a content item after selection of an associated link. The social networking system can detect and maintain the time durations over which members consumed content items after selection of associated links that have been surfaced in the social networking system. The selection of the associated link can be an outbound click that directs the user to a website distinct from the website of the social networking system. The utility factor generation module 108 can create a histogram of count values of members of the social networking system who consumed the content item can be created based on time durations over which the members consumed the content item. Each time duration for a consumption instance can be assigned to a corresponding bucket of time. In some embodiments, the histogram can be generated after a threshold number of instances of consumption of the content item is satisfied to ensure statistical significance.

From the histogram, a center time for each bucket and a total number of members associated with the consumption instances (or a total number of consumption instances) for each bucket can be determined. A normalized factor value relating to the content item can be determined based on the center time for each bucket and a total number of members for each bucket. The normalized factor value can reflect a predicted likelihood that the content item is click bait. The normalized factor value can be converted to a value of a utility factor based on a mapping. The value of the utility factor can impact the determination of an expected utility score for a content item based on the predicted likelihood that the content item is click bait. The utility factor generation module 108 is described in more detail in connection with FIG. 2.

The score generation module 110 can generate an expected utility score that informs a determination regarding whether to present a content item to a user. The expected utility score can be based on considerations that relate to the probability that a particular user will perform various types of interactions (conversions) with respect to the content item. The types of interactions can include, for example, whether the user will like the content item, whether the user will comment on the content item, whether the user will select an outbound click associated with the content item, whether the user will share the content item, whether the user will watch a video associated with the content item, whether the user will dislike the content item, whether the user will make a new connection based on the content item, whether the user will fan a page of a source of the content item, etc.

For each type of interaction for a content item, a probability that the user will perform the interaction and an associated utility value can be determined. The probability can be based on myriad factors, including the profile of the user, the demographic of the user, historical interactions of the user, relevant behavior of connections of the user, etc. In some embodiments, the probability can be determined based on machine learning techniques. The utility value for a particular type of interaction can reflect the importance (weight) of the interaction type in relation to other interaction types in predicting the overall level of interest of the user in the content item. In some embodiments, the utility values for the types of interaction can be determined by the social networking system. The utility values for the types of interactions can be based on observation, empirical evidence, goals of the social networking system, etc.

The utility value associated the interaction type relating to an outbound click can be optimized by the value of the utility factor. In some embodiments, the value of the utility factor can be multiplied with the utility value associated with the interaction type relating to an outbound click to produce an optimized utility value associated with the interaction type relating to an outbound click. When applied to the utility value associated with the interaction type relating to an outbound click in this manner, the value of the utility factor can appropriately reduce the contribution of this interaction type in the determination of the expected utility score for a content item that likely constitutes (or includes) click bait.

The expected utility score for a content item can be calculated based on the types of interaction with respect to the content item. In particular, the expected utility score can be calculated based on the probabilities that the user will perform the various types of interactions and the utility values associated with the interactions. The probabilities that the user will perform the interactions can be expressed as a multidimensional vector of probabilities. The utility values associated with the interactions, including the optimized utility value associated with the interaction type relating to an outbound click, can be expressed as a multidimensional vector of utility values. The expected utility score can be calculated by taking a dot product of the vector of probabilities and the vector of utility values that includes the optimized utility value associated with the interaction type relating to an outbound click.

The presentation module 112 can determine content items to present to the user based on their expected utility scores. The presentation module 112 can sort content items based on their expected utility scores. The presentation module 112 can identify a threshold number of content items having the highest expected utility scores determined by the score generation module 110. Alternatively or additionally, the presentation module 112 can identify content items having expected utility scores that are greater than or equal to a threshold value. The presentation module 112 can select those content items that satisfy a threshold for presentation to users. Because content items that are determined to likely constitute click bait will have expected utility scores that account for the potential presence of click bait, the presentation module 112 can reduce or eliminate the presentation of click bait to users.

The data store 118 can be configured to store and maintain various types of data, such as the data relating to the identification of content items that constitute click bait and reduction in (or elimination of) the presentation of click bait to users. The data can include data relating to, for example, the presentation of links to content items, member interactions with the content items, the number of members that consumed a content item, the time duration of consumption of each content item by a member, time intervals into which consumption instances are bucketed, center times of buckets, probability values associated with types of interactions, utility values associated with types of interactions, etc. In some embodiments, such data relating to interactions with a particular link or associated content item can be maintained in a manner that is associated with the link. The data store 118 can also maintain other information associated with the social networking system. The information associated with the social networking system can include data about users, social connections, social interactions, locations, geo-fenced areas, maps, places, events, groups, posts, communications, content, account settings, privacy settings, and a social graph. The social graph can reflect al entities of the social networking system and their interactions. As shown in the example system 100, the content management module 102 can be configured to communicate and/or operate with the data store 118.

Figure 2:
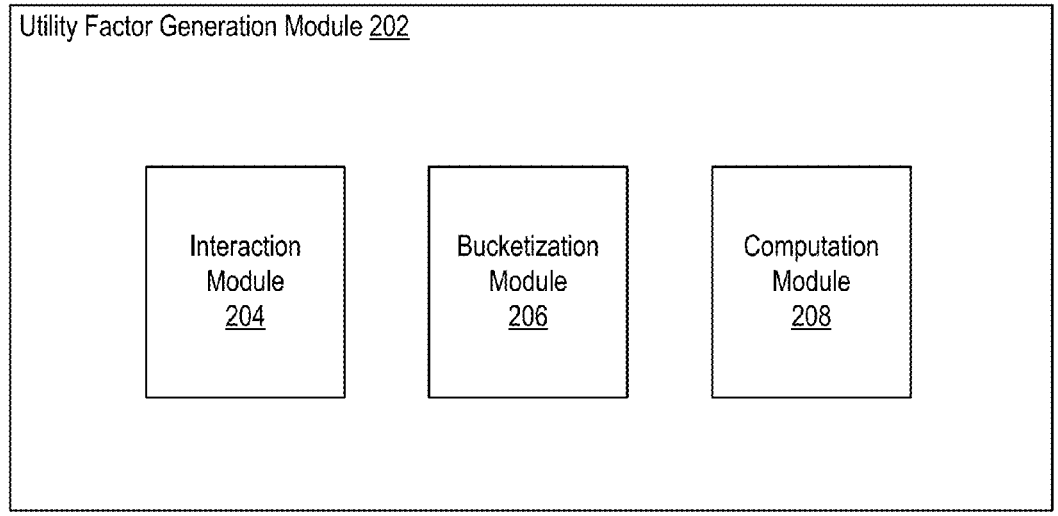
FIG. 2 illustrates an example utility factor generation module, according to an embodiment of the present disclosure.

FIG. 2 illustrates an example utility factor generation module 202, according to an embodiment of the present disclosure. In some embodiments, the utility factor generation module 108 of FIG. 1 can be implemented with the utility factor generation module 202. As shown in the example of FIG. 2, the utility factor generation module 202 can include an interaction module 204, a bucketization module 206, and a computation module 208.

The interaction module 204 can detect and monitor member interactions with content items in the social networking system. The interaction module 204 can identify all links to content items that are shared within the social networking system. The interaction module 204 also can detect and monitor access to and consumption of content items by members of the social networking system. The interaction module 204 can determine the time duration over which a member consumed a content item. For example, when a member accesses a content item through a mobile application on a client device supported by the social networking system, a web browser that is integrated with the mobile application can present the content item to the user. The integration of the browser with the mobile application can allow the social networking system to determine the time duration over which the member consumed the content item. In some embodiments, the time duration can be measured from the time that the member selected a link to the content item to the time that the member returned to the mobile application. Other techniques to determine the time duration of consumption of a content item by a member can be used. The time durations over which members consumed the content item can be logged with other interaction related data for the link associated with content item. When the data regarding time durations over which members consumed a content item on a particular device or platform (e.g., mobile application, web, iOS, etc.) can be determined, such data can be used to predict or model unavailable data regarding time durations over which members consumed the content item on other devices or platforms.

The bucketization module 206 can bucket instances of consumption of a content item by members based on the time duration for each consumption instance. Buckets of a selected time period (e.g., 5 seconds, 10 seconds, 15, seconds, 30 seconds, one minute, etc.) can be defined. For example, when a bucket is defined to be 30 seconds, a first bucket can be associated with a time interval between zero seconds and 30 seconds, a second bucket can be associated with a time interval between 31 seconds and 60 seconds, a third bucket can be associated with a time interval between 61 seconds and 90 seconds, and so on. In some embodiments, a last bucket having a latest time interval that extends into the future indefinitely (or to a maximum time) can be selected by an administrator of the social networking system. The center time of each bucket can be defined to be the middle value of the time interval. For the last bucket in time, the center time can be defined to be the initial time of the last bucket plus one half of the selected time period.

Each instance of consumption of a content item is associated with one of the buckets based on the time duration of the instance of consumption. Each bucket can have an associated counter that counts the number of members who consumed the content item over a time duration that falls within the time interval associated with the bucket. Following the example above, assume that 234 members consumed the content item over a time duration of 15 seconds, 101 members consumed the content item over a time duration of 24 seconds, 28 members consumed the content item over a time duration between 26-28 seconds, and 78 members consumed the content item over a time duration between 34-39 seconds. In this example, a counter for the first bucket associated with the time interval between zero seconds and 30 seconds has a count value of 363, a counter for the second bucket associated with the time interval between 31 seconds and 60 seconds has a count value of 78, a counter for the third bucket associated with the time interval between 61 seconds and 90 seconds has a count value of zero. In this example, the center time of the first bucket is 15 seconds, the center time of the second bucket is 45 seconds, and the center time of the third bucket is 75 seconds. The defined buckets and count values can constitute a histogram from which a utility factor can be determined. In some embodiments, the histogram is generated after a threshold number of instances of consumption of the content item is detected by the social networking system. A sufficiently high threshold number can allow for statistically significant results.

Figure 3:
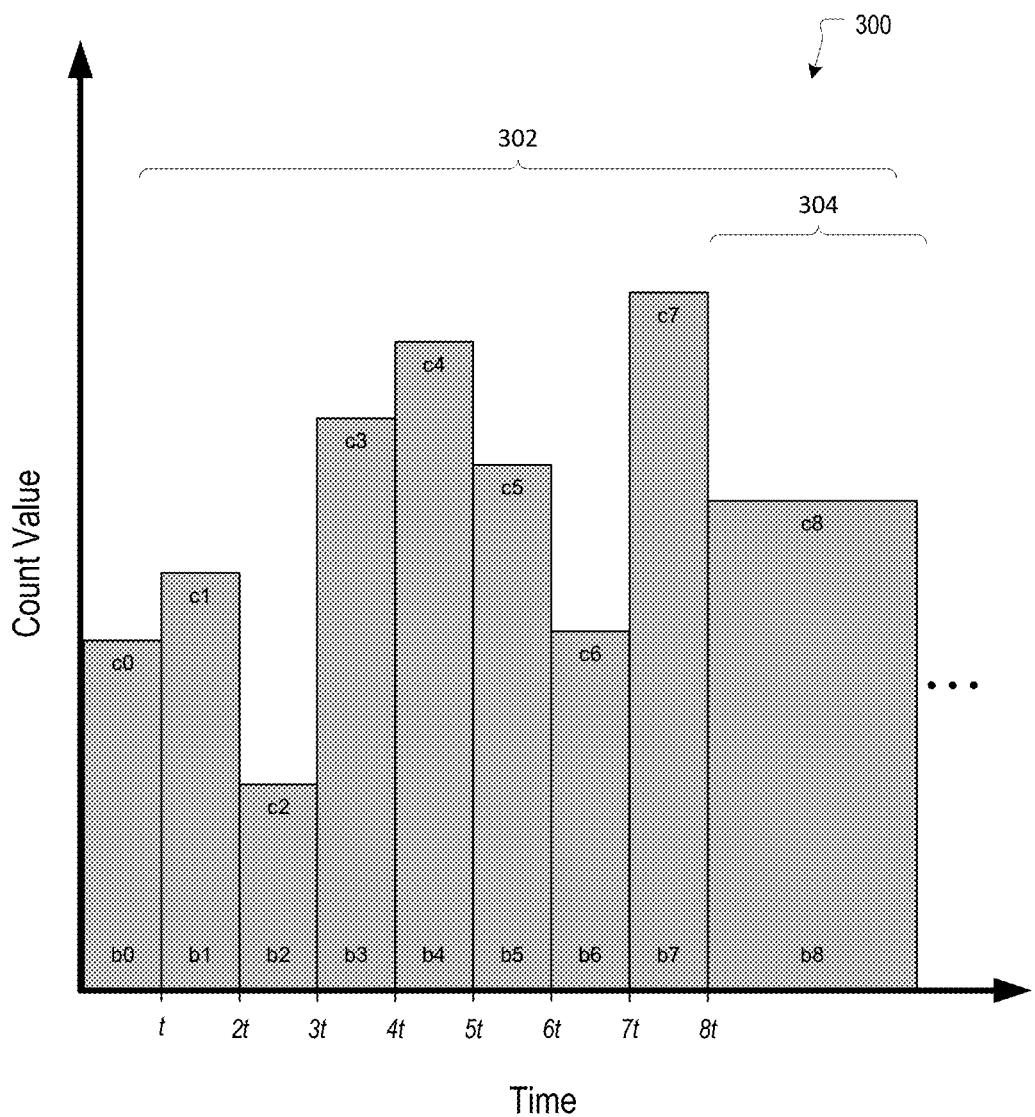
FIG. 3 illustrates an example histogram, according to an embodiment of the present disclosure.

FIG. 3 illustrates an example histogram 300 of count values of members of the social networking system who consumed a content item based on time durations over which the members consumed the content item, according to an embodiment of the present disclosure. As shown, an axis of time relates to time durations of instances of consumption of a content item by members and an axis of count value relates to the number of members who consumed the content item over a time duration that falls within an associated bucket of time.

Buckets $b_0$, $b_1$, $b_2$, $b_3$, $b_4$, $b_5$, $b_6$, $b_7$, $b_8$ are shown. Any suitable number of buckets can be defined. The buckets $b_0$, $b_1$, $b_2$, $b_3$, $b_4$, $b_5$, $b_6$, $b_7$, $b_8$ can span a time history 302. The time history 302 can be any suitable length. Each of the buckets has a time period t. A last time interval 304 associated with a last bucket $b_8$ can extend into the future indefinitely. The buckets $b_0$, $b_1$, $b_2$, $b_3$, $b_4$, $b_5$, $b_6$, $b_7$, $b_8$ have associated count values $c_0$, $c_1$, $c_2$, $c_3$, $c_4$, $c_5$, $c_6$, $c_7$, $c_8$, respectively. Each count value for a bucket represents the number of members who consumed the content item over a time duration that falls within the time interval associated with the bucket. The center time of each bucket, including the last bucket $b_8$, is an initial time of an associated time interval plus half of the time period. The center times of the buckets $b_0$, $b_1$, $b_2$, $b_3$, $b_4$, $b_5$, $b_6$, $b_7$, $b_8$ and the count values $c_0$, $c_1$, $c_2$, $c_3$, $c_4$, $c_5$, $c_6$, $c_7$, $c_8$ can be used to determine a value of the utility factor.

In connection with FIG. 2, the computation module 208 can determine a normalized factor value based on the histogram of a content item. The computation module 208 can compute a normalized factor value based on the center times of the buckets associated with the histogram and the count values associated with the buckets. In some embodiments, another selected point in time in a bucket can be used as an alternative to the center time. In some embodiments, the normalized factor value can be computed by first multiplying the square root of the center time of a bucket with the count value of the bucket to generate a product term for the bucket. The application of the square root to the center time can act as a filter that reduces (decays) the importance of the product term over time. All product terms for all buckets in the histogram can be summed to produce a numerator term. The square root of the center time of the last bucket can be multiplied with a total count value across all buckets to produce a denominator term. The total count value is the sum of the count values for all of the buckets. The numerator term can be divided by the denominator term to produce the normalized factor value. The normalized factor value therefore can be a value between zero and one.

In some embodiments, a bucket can be further segmented into sub-buckets. The sub-buckets can be defined by a corresponding period of time. Each instance of consumption of the content item can be assigned to a sub-bucket based on the time duration over which a member consumed the content item. A normalized factor value can be determined for the bucket based on the sub-buckets in a manner similar to the manner described herein.

The computation module 208 can generate a value of a utility factor based on normalized factor values. The value of the utility factor can be based on a plot (or histogram) of normalized factor values for various content items. The plot can illustrate a distribution to facilitate identification of content items that may likely constitute click bait.

Figure 4:
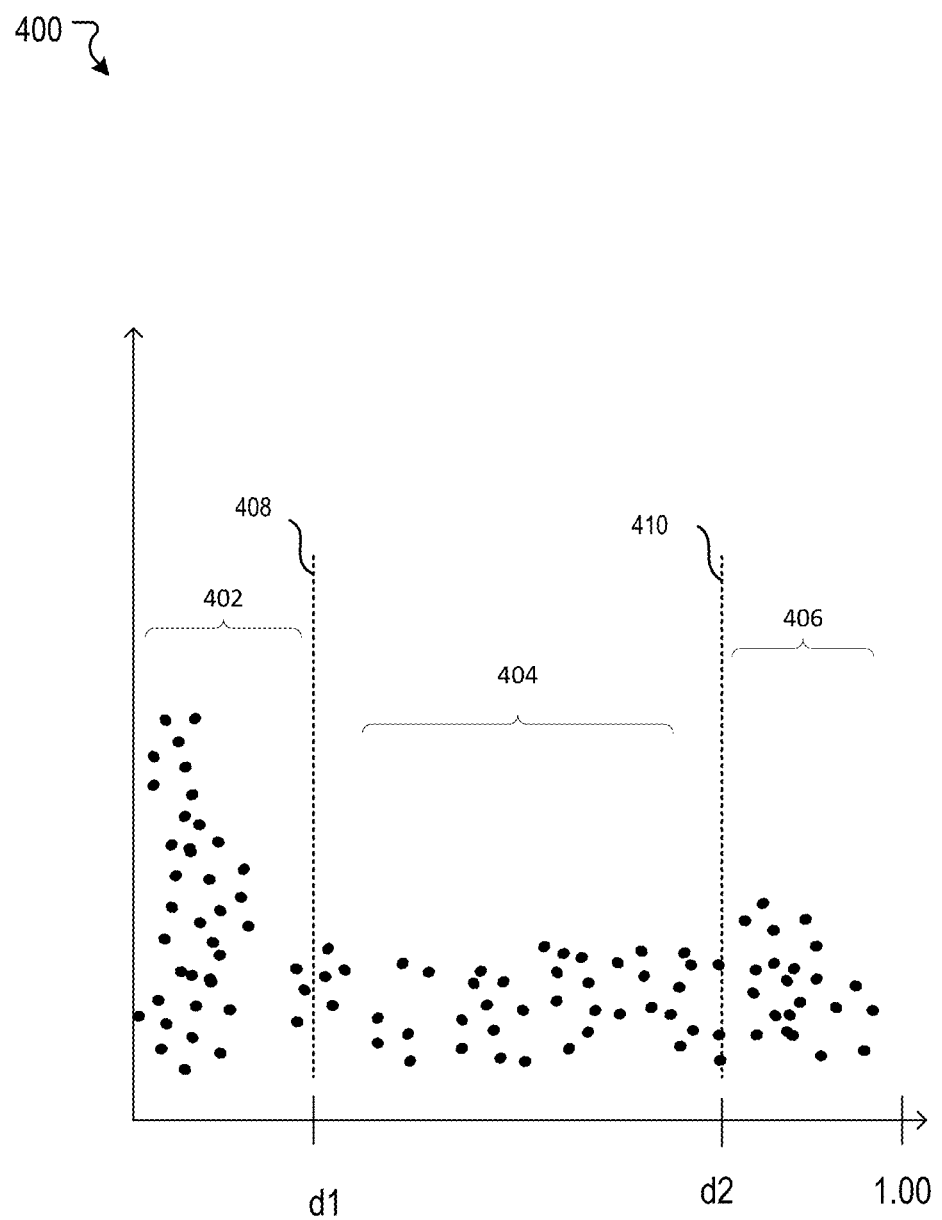
FIG. 4 illustrates an example plot, according to an embodiment of the present disclosure.

FIG. 4 illustrates a plot 400 of normalized factor values for various content items, according to an embodiment of the present invention. The plot 400 contains a first region 402 of normalized factor values, a second region 404 of normalized factor values, and a third region 406 of normalized factor values. The first region 402 can be distinguished from the second region 404 and the second region 404 can be distinguished from the third region 406 based on the distribution of the normalized factor values. As shown, a high concentration of normalized factor values occurs in the first region 402 as bounded by a line 408 that intersects the x axis at point d1. The normalized factor values in the first region 402 correspond to low values of time durations over which members consumed content items. Accordingly, the content items associated with normalized factor values in the first region 402 may be predicted with a high confidence level to be content items that constitute or include click bait. As shown, a concentration of normalized factor values occurs in the third region 406 as bounded by a line 410 that intersects the x axis at point d2. The normalized factor values in the third region 406 correspond to high values of time durations over which members consumed content items. Accordingly, the content items associated with the normalized factor values in the third region 406 may be predicted with a high confidence level to be content items that do not constitute or include click bait. Because of their intermediate values of time durations over which members consumed content items, the content items associated with the normalized factor values in the second region 404 may be difficult to classify with a high level of confidence as either content items that constitute or include click bait or content items that do not constitute or include click bait. In some embodiments, the lines 408, 410 to facilitate classification content items as click bait or not click bait can be determined by an administrator of the social networking system, a machine learning technique, or both.

In connection with FIG. 2, the computation module 208 can determine a value of a utility factor based on the plot of normalized factor values shown in FIG. 4. Each value of a utility factor can be based on a mapping of a corresponding normalized factor value. The mapping can be a linear mapping based on a determination of the likelihood that a content item is or includes click bait and the desired impact of the determination on the expected utility score in relation to other interaction types. For example, if the normalized factor value corresponds to a content item that has a high probability of being or including click bait and the desired contribution of the outbound click to the expected utility score is small, then the normalized factor value can be mapped to a relatively low value of the utility factor. As another example, if the normalized factor value corresponds to a content item that has a low probability of being or including click bait and the desired contribution of the outbound click to the expected utility score is large, then the normalized factor value can be mapped to a relatively high value of the utility factor.

In some instances, a value of the utility factor of one can indicate that a prediction regarding whether a content item is click bait or is not click bait does not impact the generation of the expected utility score of the content item. Accordingly, a value of the utility factor of one can serve as a baseline for a mapping such that the mapping can assign a value of the utility factor to be greater than one when the content item is predicted not to be click bait and can assign a value of the utility factor to be less than one when the content item is predicted to be click bait. In some embodiments, the mapping can be determined based on empirical data, manual observation, machine learning, or a combination thereof.

The computation module 208 can incorporate manual or machine learning assessments in the determination of the mapping. Such assessments can be preferred or required to identify certain content items as likely not click bait when the content items might otherwise be classified as click bait based on the relatively short time durations over which consumers consumed the content items. For example, a link that leads to a pay wall or required registration could be misidentified as click bait based on the relatively short time duration over which members consume content. As another example, a link that unexpectedly leads to a video could be misidentified as click bait based on the relatively short time duration over which members consider the content and determine that they do not wish to watch the video.

Figure 5A:
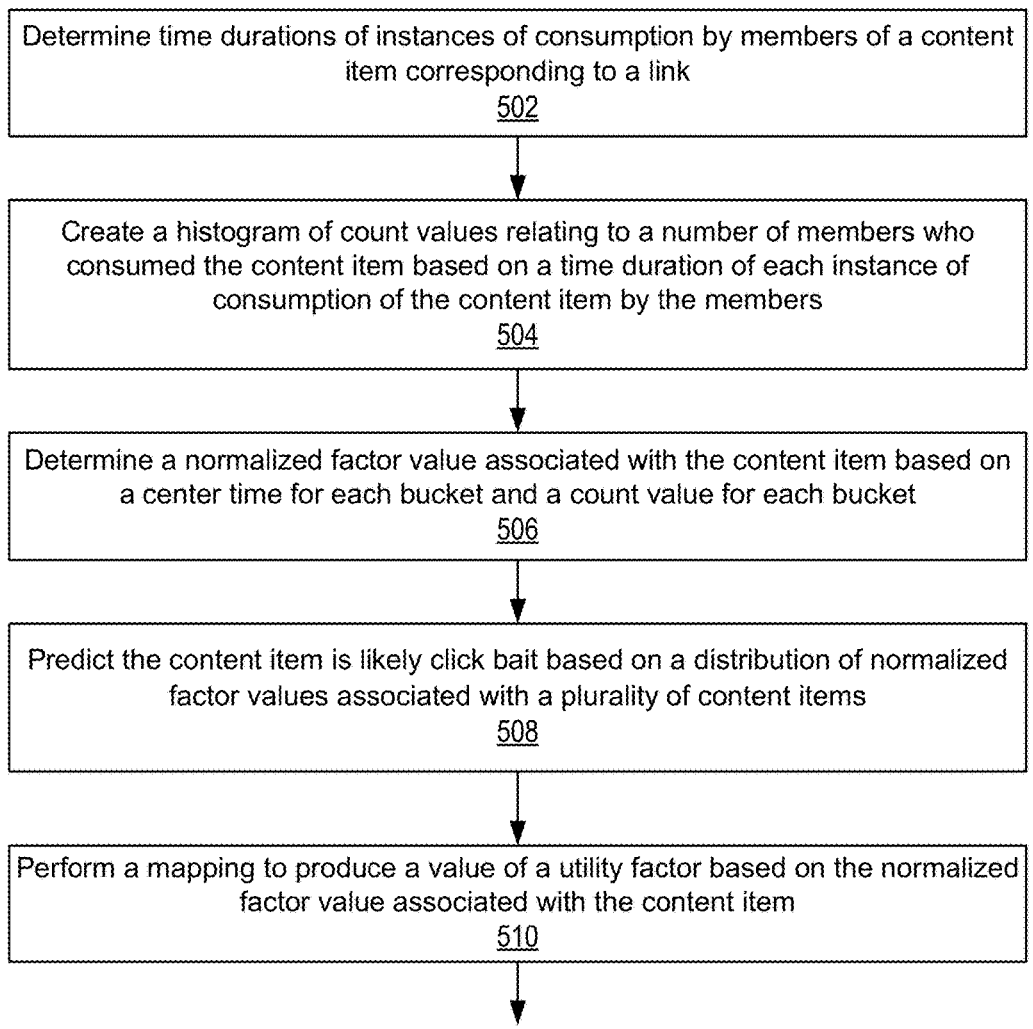
FIGS. 5A-5B illustrate an example method, according to an embodiment of the present disclosure.
Figure 5B:
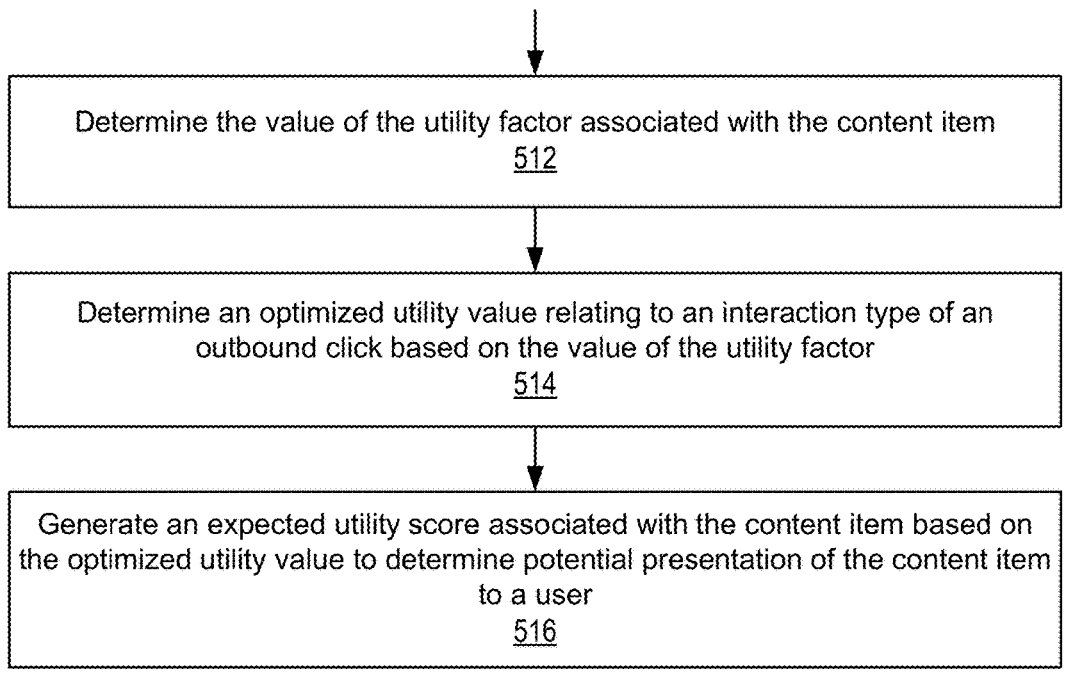

FIGS. 5A-5B illustrate an example method 500, according to an embodiment of the present disclosure. It should be appreciated that there can be additional, fewer, or alternative steps performed in similar or alternative orders, or in parallel, within the scope of the various embodiments unless otherwise stated.

At block 502, the method 500 can determine time durations of instances of consumption by members of a content item corresponding to a link. At block 504, the method 500 can create a histogram of count values relating to a number of members who consumed the content item based on a time duration of each instance of consumption of the content item by the members. At block 506, the method 500 can determine a normalized factor value associated with the content item based on the center time for each bucket and the count value for each bucket. At block 508, the method 500 can predict the content item is likely click bait based on a distribution of normalized factor values associated with a plurality of content items. At block 510, the method 500 can perform a mapping to produce a value of a utility factor based on the normalized factor value associated with the content item.

At block 512, the method 500 can determine the value of the utility factor associated with the content item. At block 514, the method 500 can determine an optimized utility value relating to an interaction type of an outbound click based on the value of the utility factor. At block 516, the method 500 can generate an expected utility score associated with the content item based on the optimized utility value to determine potential presentation of the content item to a user. Other suitable techniques are possible.

Social Networking System—Example Implementation

Figure 6:
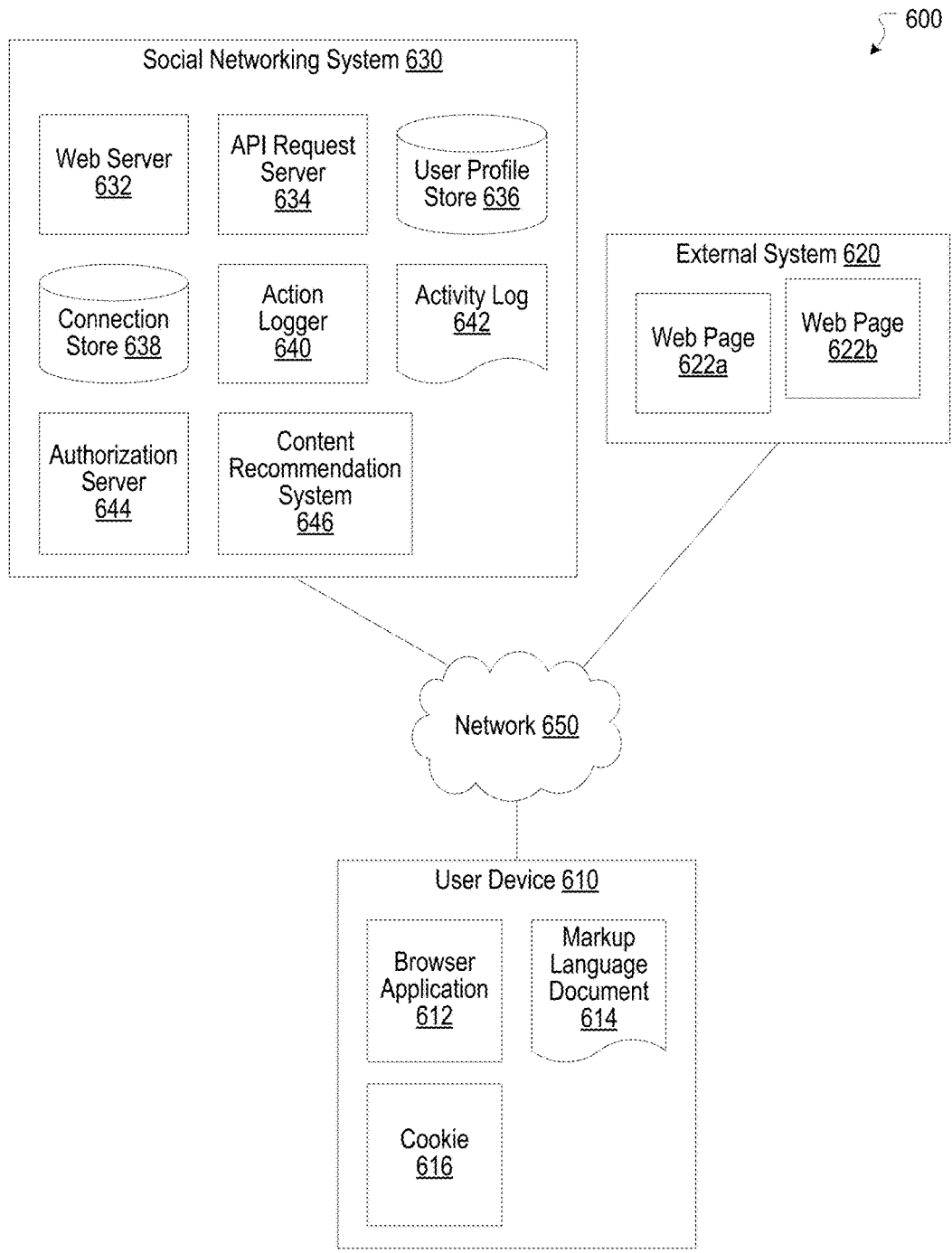
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities.

The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content management module 646. The content management module 646 can be implemented with the content management module 102.

Hardware Implementation

Figure 7:
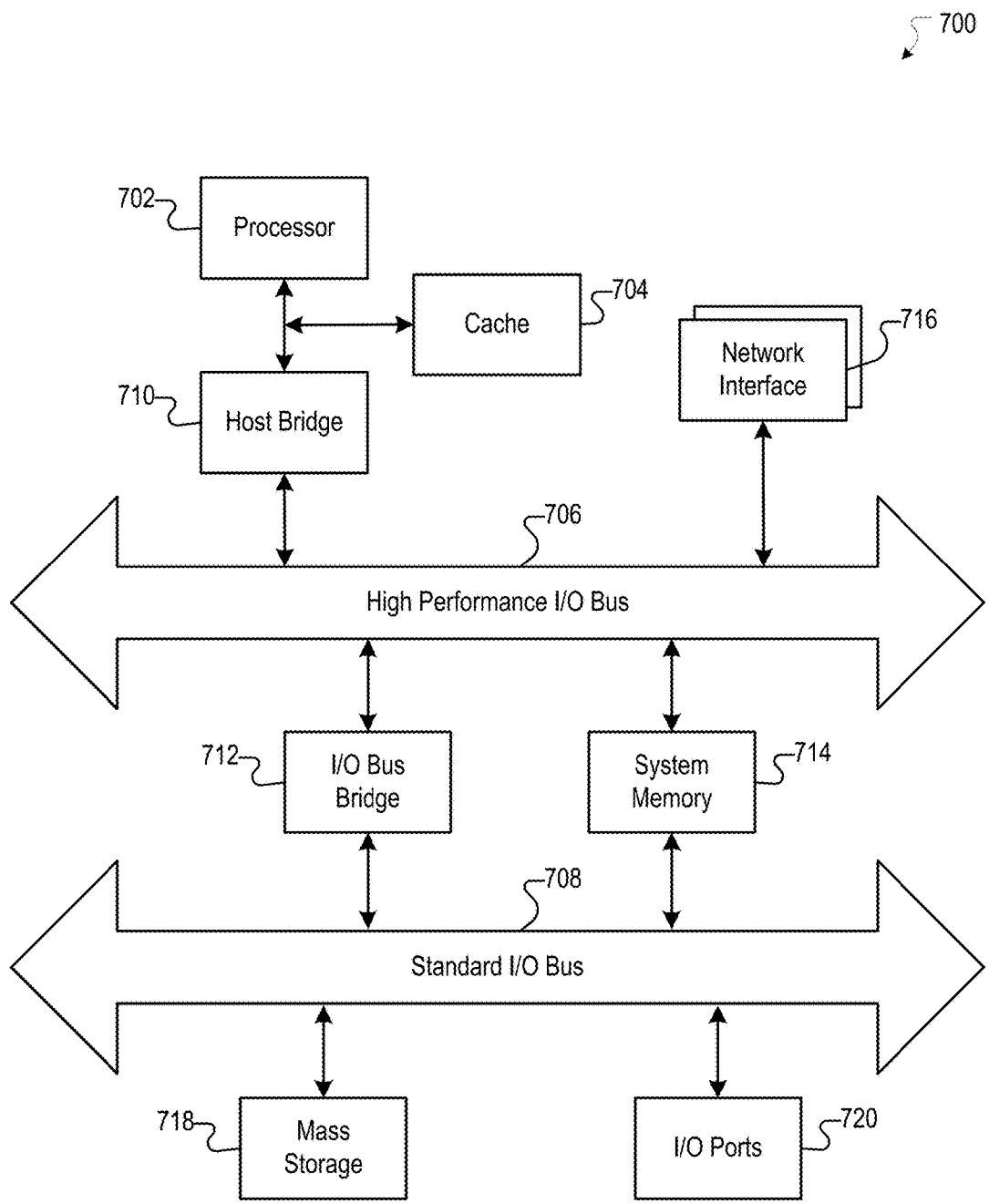
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    creating, by a computing system, a histogram of count values relating to a number of members who consumed the content item based on a time duration of each instance of consumption of the content item by the members;
    determining, by the computing system, a normalized factor value associated with a content item corresponding to a link based on information relating to the histogram;
    predicting, by the computing system, whether the content item is likely click bait based on the normalized factor value associated with the content item;
    determining, by the computing system, a value of a utility factor to be less than one when the content item corresponding to a link is predicted to be click bait;
    determining, by the computing system, an optimized utility value relating to an interaction type of an outbound click based on the value of the utility factor;
    generating, by the computing system, an expected utility score associated with the content item based on the optimized utility value to determine potential presentation of the content item to a user; and
    presenting, by the computing system, the content item to a user if a threshold is satisfied by the expected utility score associated with the content item.

2. The computer-implemented method of claim 1, wherein the creating a histogram comprises:
    determining the time durations of instances of consumption of the content item by members.

3. The computer-implemented method of claim 1, wherein the creating a histogram comprises:
    creating buckets with each bucket having an associated time interval.

4. The computer-implemented method of claim 3, wherein the creating a histogram comprises:
   determining a center time for each bucket.

5. The computer-implemented method of claim 4, wherein the creating a histogram comprises:
   determining for each bucket a count value relating to a number of members who consumed the content item over a time duration within a time interval associated with the bucket.

6. The computer-implemented method of claim 1, wherein the determining a value of a utility factor comprises:
   performing a mapping to produce the value of the utility factor based on the normalized factor value associated with the content item.

7. The computer-implemented method of claim 6, wherein the determining a value of a utility factor further comprises:
   based on the mapping, assigning the value of the utility factor to be less than one when the content item is predicted to be click bait.

8. A system comprising:
   at least one processor; and
   a memory storing instructions that, when executed by the at least one processor, cause the system to perform:
   creating a histogram of count values relating to a number of members who consumed the content item based on a time duration of each instance of consumption of the content item by the members;
   determining a normalized factor value associated with a content item corresponding to a link based on information relating to the histogram;
   predicting whether the content item is likely click bait based on the normalized factor value associated with the content item;
   determining a value of a utility factor to be less than one when the content item corresponding to a link is predicted to be click bait;
   determining an optimized utility value relating to an interaction type of an outbound click based on the value of the utility factor;
   generating an expected utility score associated with the content item based on the optimized utility value to determine potential presentation of the content item to a user; and
   presenting, by the computing system, the content item to a user if a threshold is satisfied by the expected utility score associated with the content item.

9. The system of claim 8, wherein the creating a histogram comprises:
   determining the time durations of instances of consumption of the content item by members.

10. The system of claim 8, wherein the determining a value of a utility factor comprises:
    performing a mapping to produce the value of the utility factor based on the normalized factor value associated with the content item.

11. A non-transitory computer-readable storage medium including instructions that, when executed by at least one processor of a computing system, cause the computing system to perform a method comprising:
    creating a histogram of count values relating to a number of members who consumed the content item based on a time duration of each instance of consumption of the content item by the members;
    determining a normalized factor value associated with a content item corresponding to a link based on information relating to the histogram;
    predicting whether the content item is likely click bait based on the normalized factor value associated with the content item;
    determining a value of a utility factor to be less than one when the content item corresponding to a link is predicted to be click bait;
    determining an optimized utility value relating to an interaction type of an outbound click based on the value of the utility factor;
    generating an expected utility score associated with the content item based on the optimized utility value to determine potential presentation of the content item to a user; and
    presenting, by the computing system, the content item to a user if a threshold is satisfied by the expected utility score associated with the content item.

12. The non-transitory computer-readable storage medium of claim 11, wherein the creating a histogram comprises:
    determining the time durations of instances of consumption of the content item by members.

13. The non-transitory computer-readable storage medium of claim 11, wherein the determining a value of a utility factor comprises:
    performing a mapping to produce the value of the utility factor based on the normalized factor value associated with the content item.

* * * * *